(No Model.) W. H. CLARK. 6 Sheets—Sheet 2.
CASH REGISTER.
No. 506,472. Patented Oct. 10, 1893.
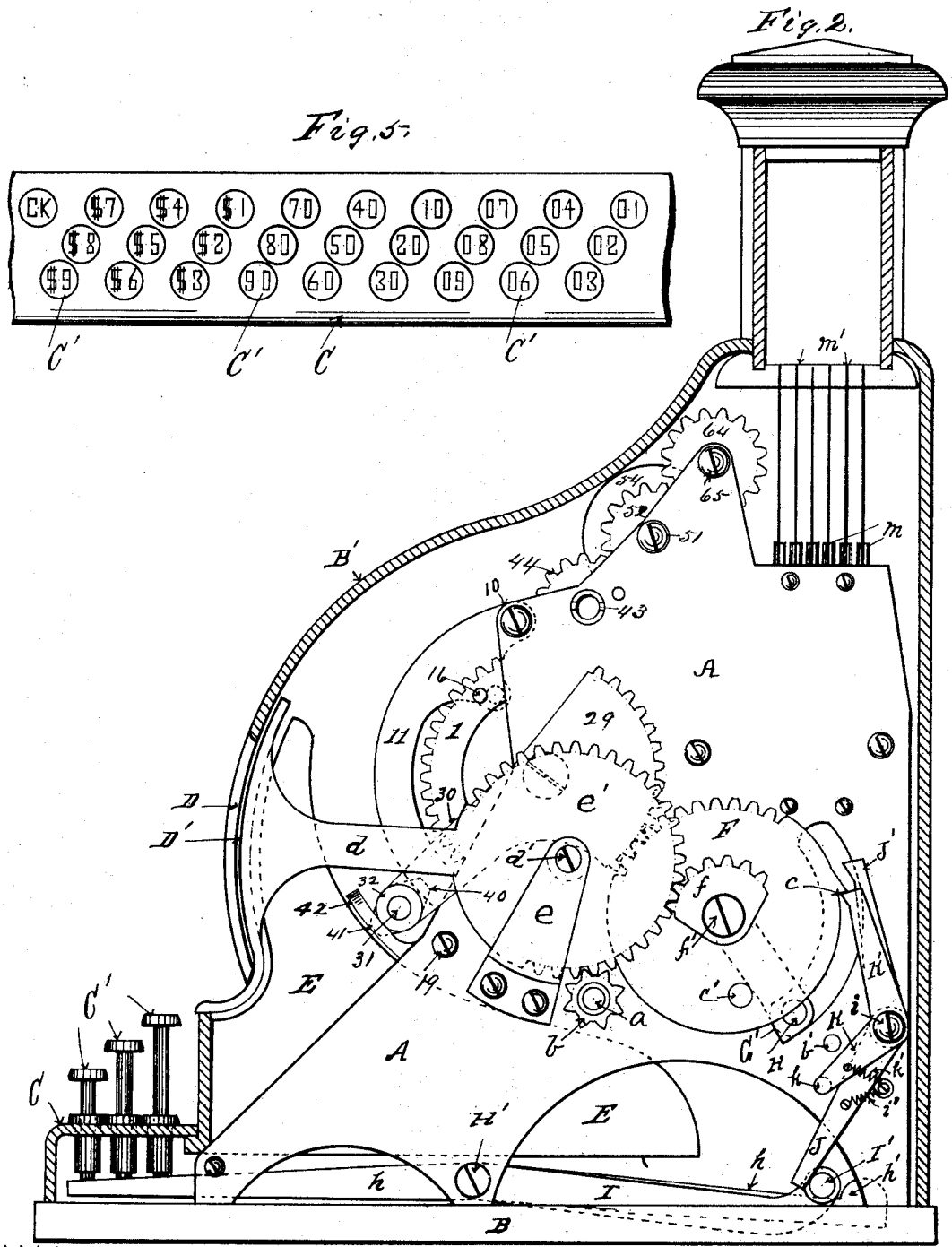
Witnesses
F. Einfeldt
A. L. Jackson
Inventor
William H. Clark
By H. Sturgeon
atty.

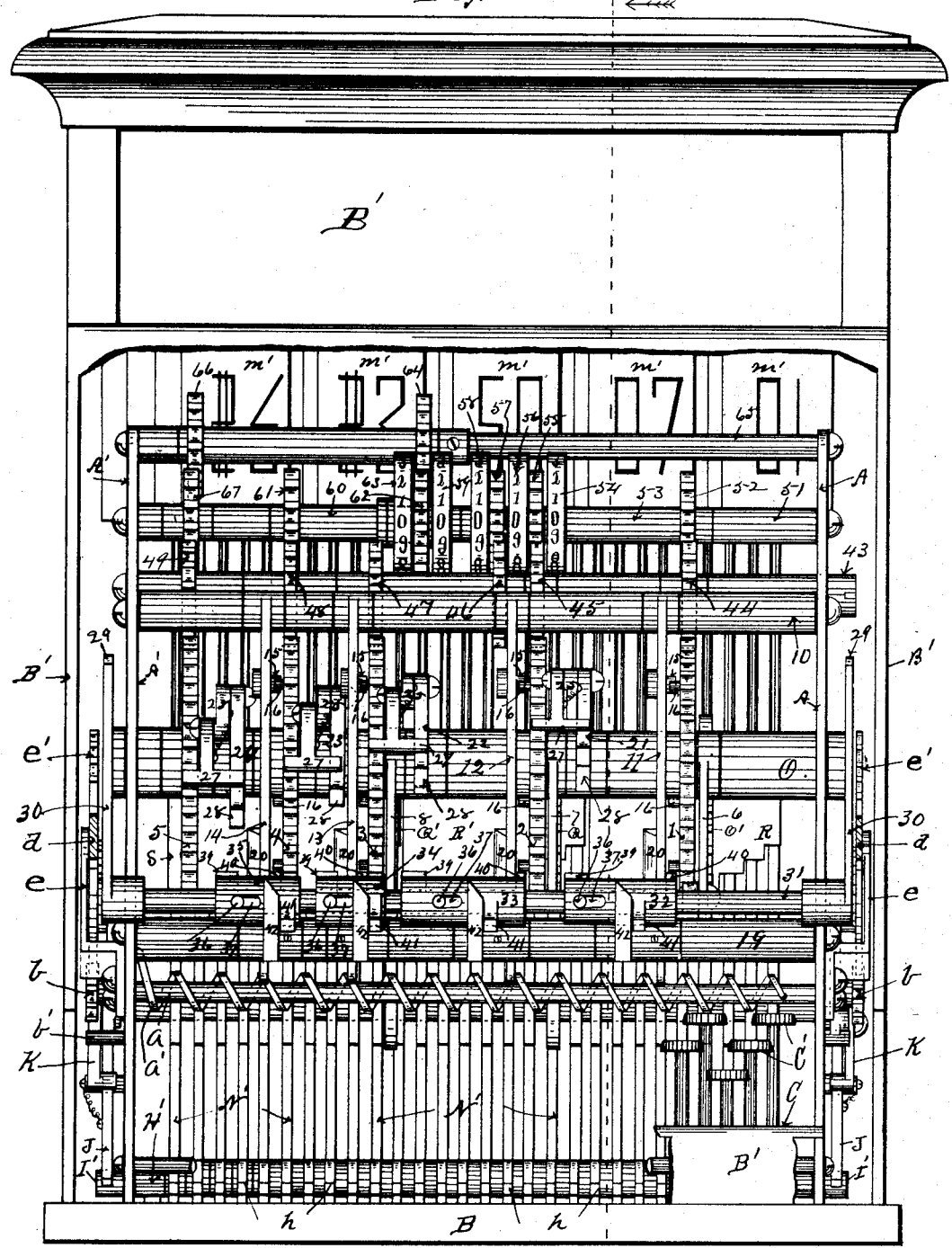

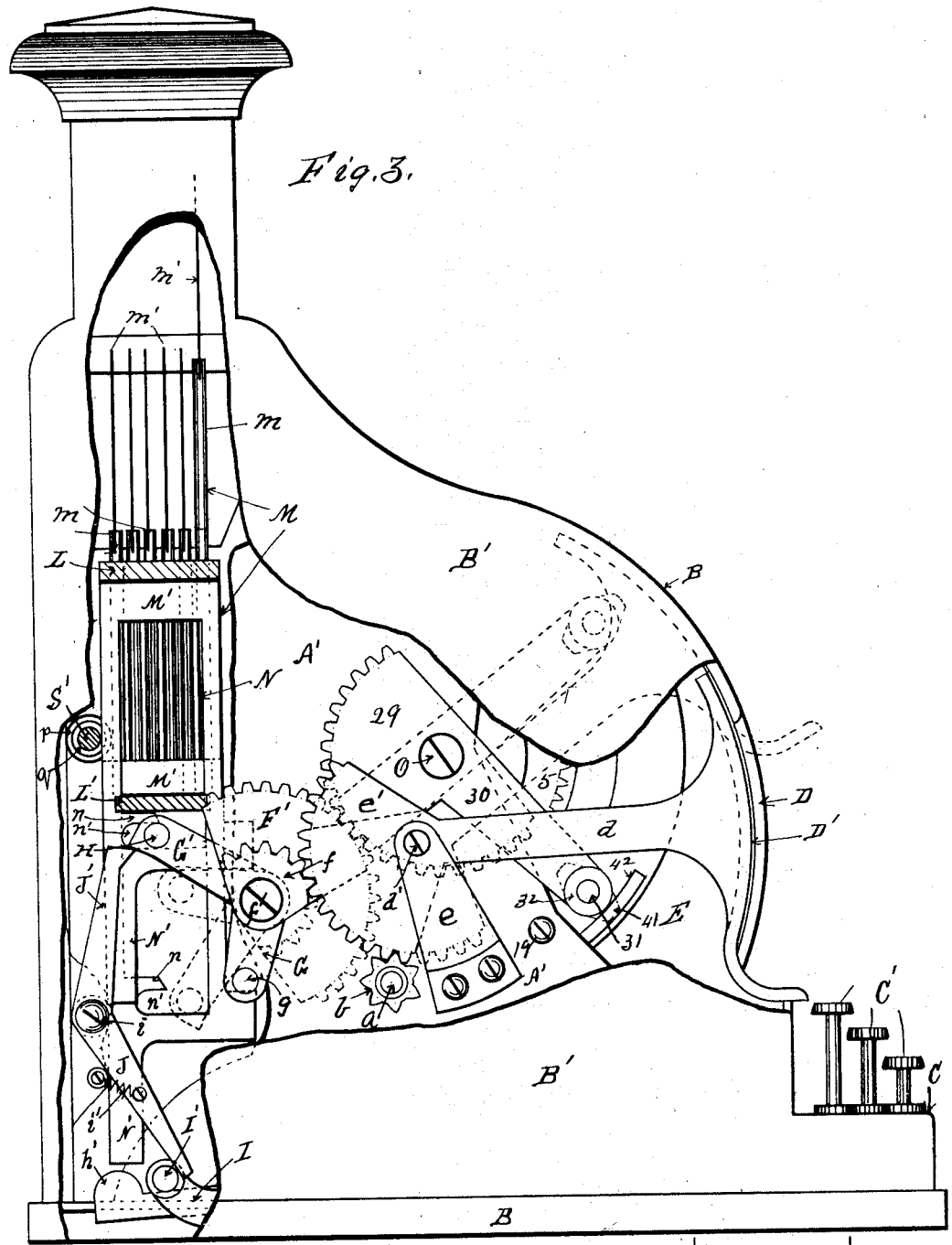

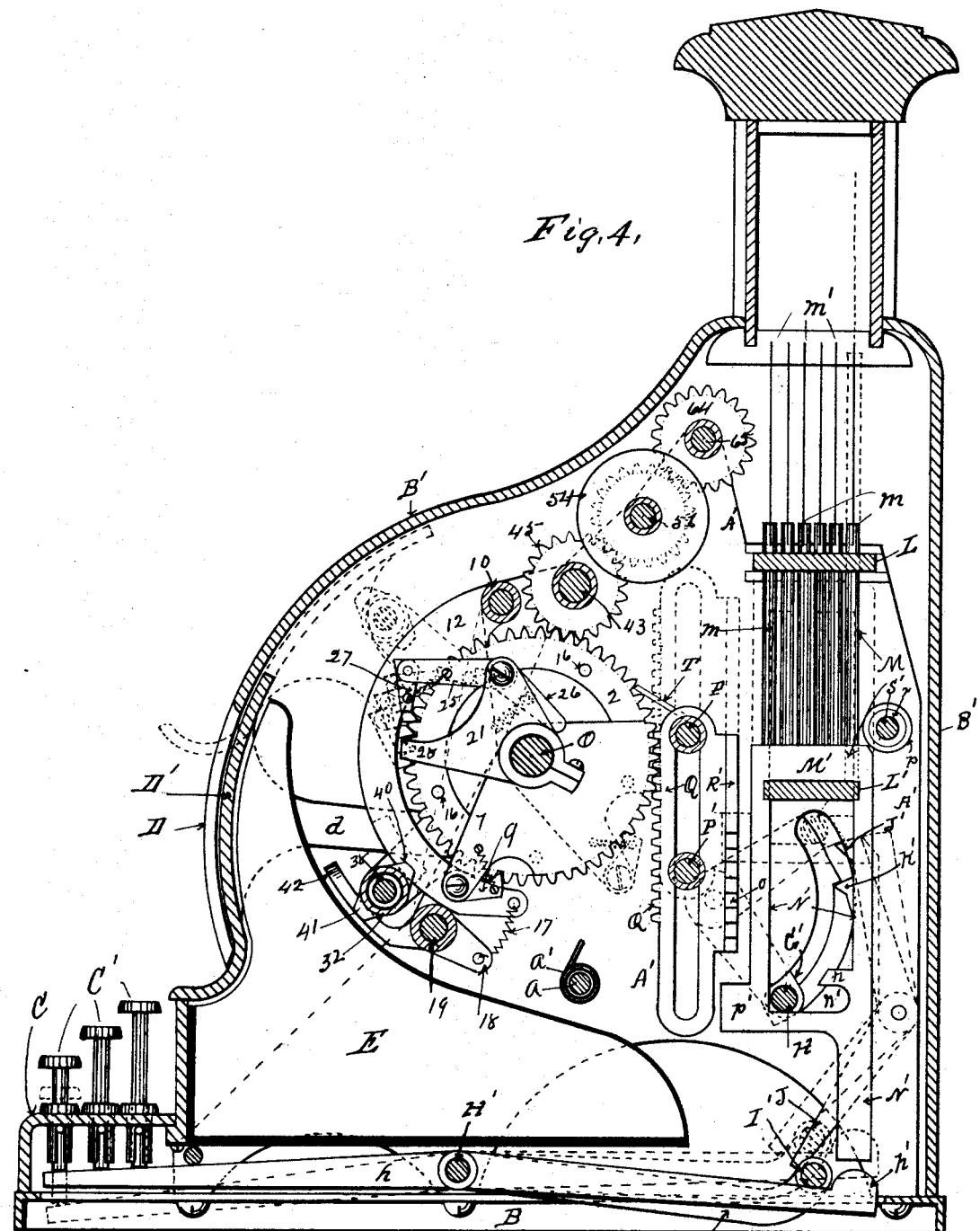

(No Model.) W. H. CLARK. 6 Sheets—Sheet 5.
CASH REGISTER.
No. 506,472. Patented Oct. 10, 1893.
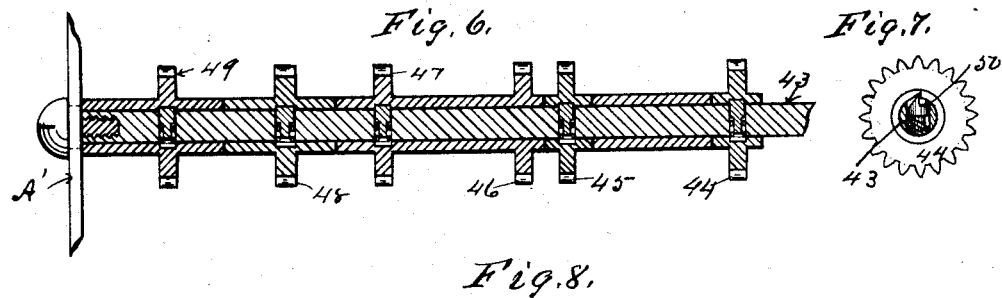
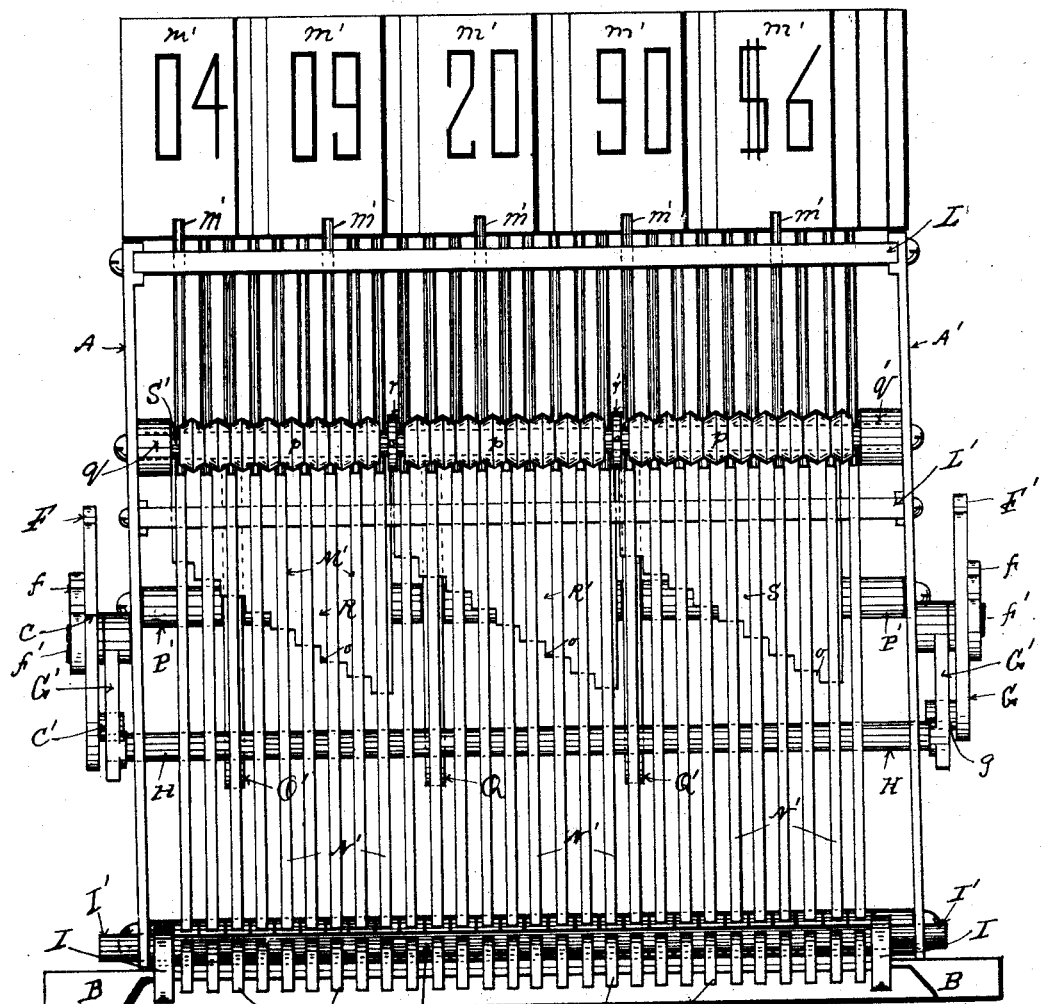

(No Model.) 6 Sheets—Sheet 6.
W. H. CLARK.
CASH REGISTER.
No. 506,472. Patented Oct. 10, 1893.
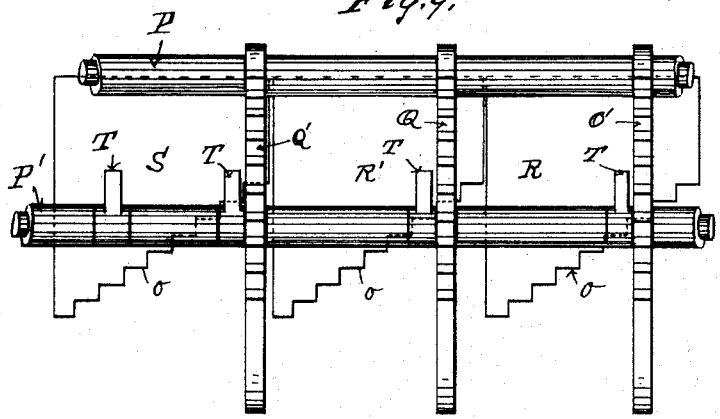
Fig. 9.
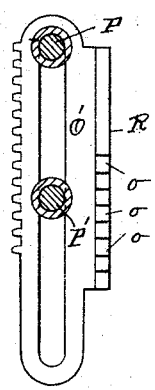
Fig. 10.
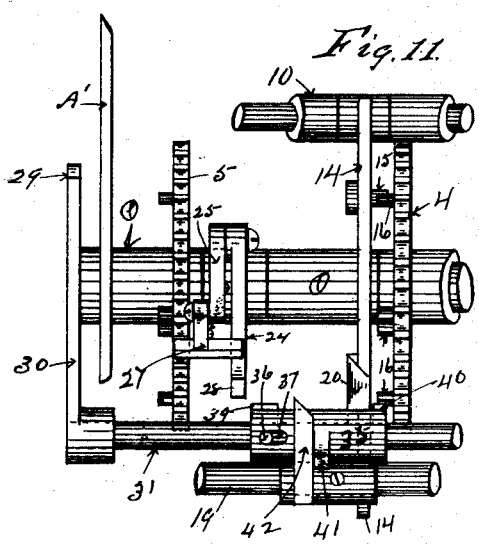
Fig. 11.
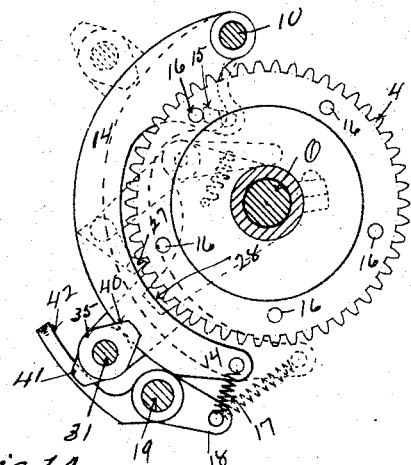
Fig. 12.
Fig. 13. Fig. 14.
Witnesses
F. Emfeldt
A. L. Jackson
Inventor
William H. Clark
By Sturgrove
Atty.

UNITED STATES PATENT OFFICE.

WILLIAM H. CLARK, OF ERIE, PENNSYLVANIA, ASSIGNOR TO THE ERIE CASH REGISTER COMPANY, OF SAME PLACE.

CASH-REGISTER.

SPECIFICATION forming part of Letters Patent No. 506,472, dated October 10, 1893.

Application filed April 10, 1893. Serial No. 469,716. (No model.)

*To all whom it may concern:*

Be it known that I, WILLIAM H. CLARK, a citizen of the United States, residing at the city of Erie, in the county of Erie and State of Pennsylvania, have invented certain new and useful Improvements in Cash-Registers; and I do hereby declare the following to be a full, clear, and exact description of the invention, such as will enable others skilled in the art to which it appertains to make and use the same, reference being had to the accompanying drawings, and to the letters and figures of reference marked thereon, forming part of this specification.

My invention consists in the improvements in cash-registers hereinafter set forth and explained and illustrated in the accompanying drawings in which—

Figure 1. is a front view in elevation of the mechanism of my improved cash-register, parts of the case and mechanism being broken away. Fig. 2. is a right hand end view of the same, the case being broken away. Fig. 3. is a left hand end view of the same, portions of the case and frame being broken away. Fig. 4. is a transverse section of the same on the line $x, x$, in Fig. 1. Fig. 5. is a top or plan view of a section of the keys and key board. Figs. 6 and 7. are sectional detail views of the resetting shaft mechanism. Fig. 8. is a detail view in elevation of a portion of the rear of the machine. Fig. 9. is a detail view in front elevation of the stepped plates and rack-bars connected therewith. Fig. 10. is an end view in elevation of the same. Fig. 11. is a detail view of a section of the register-wheel carrying mechanism. Fig. 12. is an end view of the same. Figs. 13 and 14. are details of portions thereof.

The principal features of invention involved in my improved cash-register are as follows:

The construction of a cash-register with a fixed cash receptacle, which is provided with a movable lid to the opening therein, which is operated by a spring shaft to open it, and which lid when it opens operates to raise the tablet carrier corresponding to the key operated and move the register wheel communicating with such tablet carrier forward the amount desired, and when the lid closes it then operates the register wheel carrying mechanism to move the proper register wheel or wheels forward a sufficient distance to register the amount indicated by the tablet then raised.

The other features of my invention appear hereinafter in the specification and claims.

In the construction of my improved cash-register shown in the drawings, A, A' are the end frames, B the base, and B' the case of the machine, secured together in the usual manner.

Across the front of the machine case B' is the key board C in which the operating keys C' are mounted, and in the front of the case B' is an opening D adapted to be closed by a lid D', which opening communicates with a cash receptacle E in the lower part of the front of the machine. The lid D' is provided with arms $d$ which are pivoted to studs or bearings $d'$ supported by brackets $e$ secured to the end frames A, A' of the machine; the hubs of said arms $d$ being made in the form of segmental gear wheels $e'$.

Pivoted in the end frames A, A' is a spring shaft $a$ provided with a spiral spring $a'$ for actuating it, and with spur gears $b$ on the ends thereof which intermesh with the segmental gear wheels $e'$ and actuate the lid D' through the arms $d$ in one direction to open it; at the rear of the segmental gear wheels $e'$ are segments of gears $f$ which are pivoted to stud pins $f'$ on the end frame A, A'; these segmental gears $f$ intermesh with and are operated by the gear wheels $e'$.

Secured to the segmental gear $f$ at the right hand side of the machine is a wheel F provided with a segment of gearing thereon, also with a catch $c$ on the periphery thereof, and with a laterally projecting stud pin $c'$, and secured to the segmental gear $f$ at the left hand side of the machine is a like segment of gearing F' which has secured thereto an arm G having a laterally projecting stud pin $g$ therein; pivoted also on the bearings $f'$ inside of the segmental gear wheels F and F' are arms G' which pass down at the rear of the laterally projecting stud pins $c'$ and $g$, so as to be engaged and raised thereby. These arms G' are connected together by a longitudinal rod H, so that the arms G' move in unison.

On a longitudinal rod H' secured in the central portions of the bases of the end frames A, A' are pivoted a series of key levers $h$, the forward ends of which key levers extend under and communicate with the stems of the keys C', the rear ends thereof extending back to the rear of the machine; at each side of the machine frame on the rod H', I also pivot the front ends of levers I, which levers extend backward nearly to the rear ends of the key levers $h$ where they are connected together by means of a longitudinal rod I' which rests upon the tops of the rear ends $h'$ of, and is common to all the key levers $h$, so that the operating of any one of the key levers operates to raise the rod I'.

On each of the end frames A, A' near the rear thereof, on stud pins $i$, I pivot bell-crank levers J, J', the arms J thereof resting upon the rod I' and the arms J' thereof extending upward and adapted to pass under the ends of the arms G' and support the rod H, when in a raised position (as illustrated in Fig. 3.) retracting springs $i'$ extend from the arms J of said levers and operate to return them to their normal positions; on the stud pin $i$ in the end frame A at the right hand side of the machine, I also pivot a second bell-crank lever K, K'. The arm K of this lever is provided with a laterally projecting stud $k$ which the arm J of the lever J J' engages when raised, and operates the lever K K'. The upper arm K' of this lever rides on the rim of the wheel F' hereinbefore described, and when said wheel is rotated by the closing of the lid D' engages with the catch $c$ thereon and retains the lid D' in a closed position. A retracting spring $k'$ is also connected with the arm K of the lever K K', which operates to return said lever to its normal position.

In operation when the rear end $h'$ of one of the key levers $h$ is raised, it raises the rod I' which operates the levers J J' to disengage them from the arms G' which allows the levers G' and the rod H connecting them, to return by gravity to their normal position. The rod I' continuing meanwhile to be moved on upward by the key lever, brings the arm J of the lever at the right hand end of the machine into contact with the laterally projecting stud $k$ on the arm K of the lever K K' and raises the arm K of said lever until the arm K' thereof is disengaged from the catch $c$ on the wheel F, which operates to release it, when the spring shaft $a$ operating on the segmental gear wheel $e'$ raises the lid D' to the position shown in dotted lines in Fig. 4, and thereby uncovering the opening D through which access is had to the cash receptacle E.

Across the rear of the machine I secure to the end frames A A' longitudinal bars L L' which support the vertically moving tablet carriers M. These tablet carriers consist of lower sections M' and upper sections or rods $m$ in the tops of which indicating tablets $m'$ are secured in the usual manner. In the lower sections M' of these tablet carriers, I make rectangular openings N, and from the rear sides of said openings near the lower part thereof, I make an inwardly extending lug $n$, so as to form an open slot $n'$; through the rectangular openings N in the lower sections M' of the tablet carriers, the rod H connecting the arms G' extends. From the bottoms of the rear portions of the lower sections M' of the tablet carriers, I make downwardly projecting lugs N' which extend nearly down to the rear ends $h'$ of the key levers $h$; each of these lugs being adapted to be engaged by one of the key levers, so that when the rear end $h$ of any one of the key levers $h$ is raised it operates to raise the tablet carrier corresponding thereto, the distance of the traverse of the key lever, which operates to carry the rod H into the open slot $n'$ in such tablet carrier far enough, so that when the lever K K' is disengaged from the catch $c$ on the wheel F, the spring shaft $a$ operating through the mechanism connecting it with the wheel F and lever G operates through the studs $c'$ and $g$ to continue the traverse of the rod H on upward carrying such partially raised tablet carrier with it, until its full height of traverse is completed when the arms J' of the lever J J' engage with the ends of the arms G' and retain the rod H and the tablet carrier M supported thereby in such raised position, until released by the operation of one of the key levers as hereinbefore described.

On a longitudinal rod O secured between the end frames A A' of the machine, are mounted register wheels 1—2—3—4 and 5, and mounted loosely on said rod adjacent to the register wheels 1—2— and 3 are segments of gears 6—7 and 8 which communicate with and move said register wheels forward by means of spring actuated dogs 9 mounted thereon and engaging said register wheels; on rods P and P' are mounted vertically sliding racks O', Q and Q' which intermesh with and operate the segmental gears 6, 7 and 8; to the backs of the sliding racks O', Q and Q' are secured plates R, R' and S (see Figs. 9 and 10); these plates are provided with steps $o$, there being a step corresponding to each tablet carrier M. The steps $o$ in the plate R corresponding to the keys and the tablets representing cents from 1 to 9 inclusive; the steps $o$ on the plate R' corresponding to the keys and the tablets representing cents by tens from 10 to 90 inclusive, and the steps $o$ on the plate S corresponding to the keys and the tablets representing dollars from 1 to 9 inclusive.

At the rear of these groups of tablet carriers a little above the rear of the tops of the lower sections M' thereof is a rod S' (see Fig. 8), which is provided with fixed collars $q$ $q'$ $r$ $r'$, at each side of and between the groups, and between the fixed collars are beveled loose sliding collars $p$, the space between each pair of fixed collars being entirely filled by the collars $p$, except space enough for one tablet carrier M to pass up at a time and no more. Thus it becomes impossible to raise more than one tablet carrier in each group at the same time.

On the front lower corner of the lower section M' of the tablet carriers M, I make lugs $p'$ which projects forward therefrom under the stepped plates in front of the tablet carriers (see Fig. 4), so that when any one of the tablet carriers is raised as hereinbefore described, it engages with the step $o$ in the stepped plate opposite and carries the plate, together with the vertically moving rack secured thereto up with it, which operates to rotate the segment intermeshing therewith, which through the dog 9 thereon operates to rotate the register wheel adjacent thereto forward the number of teeth desired; a dog T mounted on the rod P engaging with each register wheel and preventing any backward movement thereof. When however, the rack bar is returning to its normal position and in its downward traverse rotating the segment intermeshing therewith backward, the dog 9 passes over the teeth of the register wheel upon which it operates freely.

On a rod 10 secured between the end frames A A' above the register wheels 1, 2, 3 and 4 are mounted adjacent to one side of said register wheels curved guides 11, 12, 13 and 14, (see Fig. 14;) the shape of the peripheries of these arms being substantially that of a segment of a circle; these guides 11, 12, &c., are each also provided with a laterally projecting beveled stud 15, which is adapted to be engaged by laterally projecting studs 16 in the register wheels 1, 2, &c., and when the studs 16 contact with studs 15 they operate during the passage thereof over studs 15 to depress the curved guides 11, 12, &c., as illustrated in dotted lines in Fig. 12, they being returned to their normal positions by retracting springs 17 extending therefrom to fixed arms 18 on the rod 19.

On the sides of the guides 11, 12, &c., near the lower ends thereof are inclined surfaces 20, as and for the purpose hereinafter set forth.

On the rod O and firmly secured thereto, between the guide 11 and the register wheel 2; between the guide 12 and the register wheel 3; between the guide 13 and the register wheel 4, and between the guide 14 and the register wheel 5 are fixed arms 21, 22, 23 and 24, in the upper part of which are pivoted spring actuated bell-crank levers 25, 26; on the arms 25 of these levers, I mount spring actuated dogs 27, which extend over and engage with the teeth of the register wheels 2, 3, &c., and also extend in the opposite direction far enough to engage with a stop 28 on the fixed arms 21, 22, &c., which stops operate to limit the forward traverse of the spring dogs 27, so that each time they are moved forward they carry the register wheels 2, 3, &c., with which said dogs 27 engage forward one tooth and no more.

On the ends of the rod O outside of the end frames A A' I pivot segments of gearing 29 which intermesh with and are actuated by the segments of gearing F and F' hereinbefore described. On these segments 29 are secured arms 30 which extend far enough so that the traverse of the rod 31 which connects the ends of said arms 30 together is outside of the curved guides 11, 12, &c. On this rod 31 is mounted sleeves 32, 33, 34 and 35, these sleeves being secured on said rod 31 by means of pins 36, which pass through slots 37 in said sleeves and into the rod 31; these sleeves are also provided with spiral springs 38 which normally operate to move the sleeves endwise on the rod 31 toward the left (as illustrated in Fig. 13.) as and for the purpose hereinafter set forth. On these sleeves are also lugs 39, 40 and 41.

In operation the rod 31 and the sleeves 32, 33, &c., are carried upward by the action of the gearing communicating with the segments 29 on the arms 30 each time the lid D' of the cash receptacle E is opened, and moved downward to the position illustrated in Figs. 11 and 12, each time said lid is closed; the inclined guide 42 secured to the fixed sleeves 43 on the rod 19 operating at each downward traverse of the rod 31 to force every one of the sleeves 32, 33, &c., to the right, compressing the springs 38 therein, which operation forces the lugs 40 on said sleeves to pass up the inclined surfaces 20 on the curved guides 11, 12, &c., depressing said guides meanwhile sufficiently to allow said lugs to pass over said guides and become engaged with the right hand sides thereof as illustrated in Figs. 11 and 12. When in this position the sleeves 32, 33, &c., travel back and forth over the guides 11, 12, &c., until one of the studs 16 in the register wheels 1, 2, &c., engages with the beveled stud 15 in the curved guide adjacent thereto, and depresses said curved guide sufficiently to release the lug 40 on the sleeve 32, 33, &c., traveling over such guide therefrom, which allows the spring 38 to move said sleeve to the left. Then on the next downward traverse of the rod 31, the lug 39 on such sleeve engages with the dog 27 on the left hand side thereof and moves it forward carrying the register with which said dog engages therewith until said dog strikes the fixed stop 28 on the arm 21, when the lug 41 on said sleeve engages with the inclined guide 42, which disengages the lug 39 on said sleeve from the dog 27 by moving said sleeve to the right again as hereinbefore described, this operation being repeated as often as one of the studs 16 in any of the register wheels engages with the stud 15 on any of the curved guides 11, 12, &c., and depresses the same as hereinbefore described.

Above the register wheels 1, 2, &c., is a shaft 43 mounted in the end frames of the machine upon which shaft is mounted spur gear wheels 44, 45, 46, 47, 48 and 49 (see Fig. 6); of these, the wheels 44, 45, 47, 48 and 49 intermesh with the register wheels 1, 2, 3, 4 and 5 and are connected with the shaft 43 by means of a spring dog and ratchet mechanism 50. (See Figs. 6 and 7.)

On a rod 51 secured between the ends of the machine above and somewhat to the rear of the shaft 43, is mounted a spur gear wheel 52 which intermeshes with the spur gear 44, and by means of a sleeve 53 communicates motion to the first register indicating wheel 54 mounted on said shaft 51; a spur gear wheel 55 which is secured to and operates the second register indicating wheel 56 and intermeshes with the spur gear 45; a spur gear wheel 57 secured to the third register indicating wheel 58 which gear wheel 57 intermeshes with the gear wheel 46, which is connected by a sleeve to the gear wheel 47 which intermeshes with and is driven by the third register wheel 3; the fourth register indicating wheel 59 is connected with a spur gear wheel 61 by means of a sleeve 60 operating on the rod 51, which gear wheel intermeshes with and is driven by the spur gear wheel 48, and around the sleeve 60 on the rod 51 is mounted a spur gear wheel 62 secured to and operating the fifth register indicating wheel 63, which spur gear wheel 62 intermeshes with a spur gear wheel 64 mounted on a rod 65, said wheel 64 communicating with a spur gear wheel 66 which intermeshes with a spur gear wheel 67 on the rod 51, which wheel 67 intermeshes with and is driven by the spur gear wheel 49, thus communicating the movement of each of the register wheels 1, 2, &c., to its corresponding register indicating wheel.

Having thus fully described the several parts of the mechanism of my improved cash-register and the operation of the same, it is believed that the operation of the machine, as a whole, is so obvious that further description thereof is unnecessary.

In the drawings and in the description of my invention hereinbefore given, I have shown and described convenient mechanism for utilizing my invention, so that others skilled in the art to which it appertains can readily construct and operate the same. It is manifest however, that many modifications of the construction thereof can readily be made without departing from the spirit of my invention; therefore, I do not desire to limit myself to the exact construction shown and described, as

What I claim as new, and desire to secure by Letters Patent of the United States, is—

1. In a cash-register, the combination of a stationary cash receptacle, a movable lid therefor, spring mechanism for opening said lid, and registering and indicating mechanism communicating with said lid and operating in unison therewith, substantially as described.

2. In a cash-register, the combination of a movable lid for the cash receptacle, tablet carrier mechanism, register mechanism, and intermediate gear and lever mechanism between said movable lid, and the tablet carrier mechanism, and the register mechanism, substantially as described.

3. In a cash-register, the combination of a movable cash receptacle lid, tablet carrier mechanism, register wheel mechanism, intermediate gear and lever mechanism between said movable lid and the tablet carrier and register mechanism, and key lever mechanism for starting the tablet carriers upward, and releasing said movable lid, substantially as described.

4. In a cash-register, the combination of a movable cash receptacle lid, spring mechanism adapted to open said lid, tablet carrier mechanism, register wheel mechanism, intermediate gear and lever mechanism between said movable lid and the tablet carrier and register mechanism, lever and stop mechanism for retaining said lid in a closed position, and key lever mechanism for starting the tablet carriers upward, and releasing the lid retaining lever and stop mechanism, substantially as described.

5. In a cash-register, the combination of a movable cash receptacle lid, vertically moving tablet carrier mechanism, register wheel mechanism, intermediate gear and lever mechanism between said movable lid, and the vertically moving tablet carriers, and the register mechanism, spring mechanism communicating with said gear and lever mechanism and adapted to open said lid, raise the tablet carriers and rotate the register mechanism, a catch or stop on said intermediate gear mechanism, stop lever mechanism adapted to engage said catch or stop and retain said lid in a closed position, lever mechanism adapted to engage the tablet carrier raising mechanism and retain the same in a raised position, key levers communicating with lever mechanism common to all of the key levers of the machine and adapted to operate said first named levers, and also communicating with and adapted to start the tablet carriers upward, substantially as set forth.

6. The combination in a cash-register, of key levers, levers as I connected by a rod as I' common to all of said levers, levers as J J' communicating with said rod I' and adapted to be operated thereby, and a stop lever as K K' adapted to be operated by the lever J J'; substantially as described.

7. The combination in a cash-register, of key levers, levers as I connected by a rod as I' common to all of said key levers, tablet carriers as M adapted to be engaged and started upward by the key levers, a tablet carrier raising rod common to all of the tablet carriers and adapted to engage any one of the tablet carriers when such tablet carrier is started on its upward traverse, and levers as J J' adapted to engage said tablet carrier rod and retain it in an upraised position, and communicating with and adapted to be operated by said rod I', substantially as described.

8. The combination in the register wheel carrying mechanism of a cash-register, of an oscillating lid for closing the cash receptacle, and intermediate lever and gear mechanism connecting said lid with said register wheel carrying mechanism, substantially as described.

9. The combination in a cash-register, of tablet carriers, key levers communicating with said tablet carriers and operating to start them upward, and mechanism for automatically completing the raising of the tablet carriers and primarily rotating the register wheels to register amounts thereon, with register wheel carrying mechanism, and an actuating mechanism therefor operating independently of the key-lever mechanism, and after the action of the key-levers is completed, to secondarily rotate the register wheels to carry amounts from one register wheel to another, substantially as set forth.

10. The combination in a cash-register of tablet carriers, register wheels, key levers communicating with said tablet carriers, an oscillating lid to the cash receptacle, intermediate gear and lever mechanism between said lid and the tablet carriers and register wheels, whereby said tablet carriers are raised and the register wheels rotated after the tablet carriers have been started upward by the key levers, and register wheel carrying mechanism communicating by intermediate gear and lever mechanism with said lid mechanism, and operating independently of the key levers, substantially as described.

11. The combination in a cash-register of tablet carriers, key levers communicating therewith, register wheels, communicating with the tablet carriers, and register wheel carrying mechanism consisting of curved guides, oscillating dog actuating mechanism, and dogs communicating with said register wheels, and operated by said oscillating dog actuating mechanism, substantially as described.

12. The combination in a cash-register, of register wheels, curved guides actuated in one direction by said register wheels, and in the other direction by spring mechanism, a yielding dog mechanism communicating with and adapted to actuate the register wheels, a reciprocating rod traveling over said curved guides and carrying laterally moving dog actuating mechanism for moving said yielding dogs forward, and stops for limiting the movement of said dogs, substantially as described.

13. The combination in a cash-register, of register wheels, a swinging curved guide adjacent to each of said register wheels, studs in said register wheels adapted to engage studs on said guides adjacent thereto and depress them, a yielding dog communicating with each register wheel, a fixed stop for limiting the forward motion of each of said dogs, an oscillating rod travelling around outside of said guides, a sliding sleeve on said rod adapted to travel over each of said guides until such guide is depressed when it moves to the left on said rod and engages the register wheel actuating dog adjacent thereto, and inclined fixed arms near the bottom of the traverse of said rod adapted to move said sleeves back into engagement with said guides, substantially as set forth and described.

In testimony whereof I affix my signature in presence of two witnesses.

WILLIAM H. CLARK.

Witnesses:
J. M. SHERWIN,
M. E. GRISWOLD.